(No Model.) 2 Sheets—Sheet 1.

H. S. PRUYN.
ELECTRIC RAILWAY.

No. 517,886. Patented Apr. 10, 1894.

WITNESSES:
Frank S. Ober
C. V. Edwards.

INVENTOR
Henry S. Pruyn
BY
M. A. Rosenbaum
ATTORNEY (No Model.) 2 Sheets—Sheet 2.

H. S. PRUYN.
ELECTRIC RAILWAY.

No. 517,886. Patented Apr. 10, 1894.

WITNESSES:
Frank S. Ober
C. V. Edwards

INVENTOR
Henry S. Pruyn
BY
Wm A. Rosenbaum
ATTORNEY.

UNITED STATES PATENT OFFICE.

HENRY S. PRUYN, OF HOOSICK FALLS, NEW YORK, ASSIGNOR TO JAMES S. GIBBS, OF CHICAGO, ILLINOIS.

ELECTRIC RAILWAY.

SPECIFICATION forming part of Letters Patent No. 517,886, dated April 10, 1894.

Application filed November 1, 1893. Serial No. 489,727. (No model.)

*To all whom it may concern:*

Be it known that I, HENRY S. PRUYN, a citizen of the United States, residing at Hoosick Falls, in the county of Rensselaer and State of New York, have invented certain new and useful Improvements in Electric Railways, of which the following is a full, clear, and exact description.

This invention has reference to electric railways in which the electrical conductors supplying current to the moving vehicles are located in a conduit formed in the road bed. Some features of the invention are also applicable to systems in which the conductors are located above the ground but beneath the car.

The object of the invention is to provide a system of this nature in which the leakage of electricity is reduced to the minimum and in which the mechanical construction is such that it may be easily applied and removed from the conduit.

Other objects of minor importance are incidentally accomplished which it is unnecessary to specifically point out.

The invention comprehends the use of a main insulated feeder and a sectional working conductor, the sections of which are supplied with current automatically as the car moves along and are left out of circuit when the car passes. The main feeder will ordinarily be permanently located in the conduit, but the sectional conductor with its insulating supports are adapted to be removed from the conduit bodily for the purpose of examination and repairs whenever desired and this operation may be performed with great facility.

The invention will be specifically described in the description which follows, and with reference to the accompanying drawings, in which—

Figure 1:
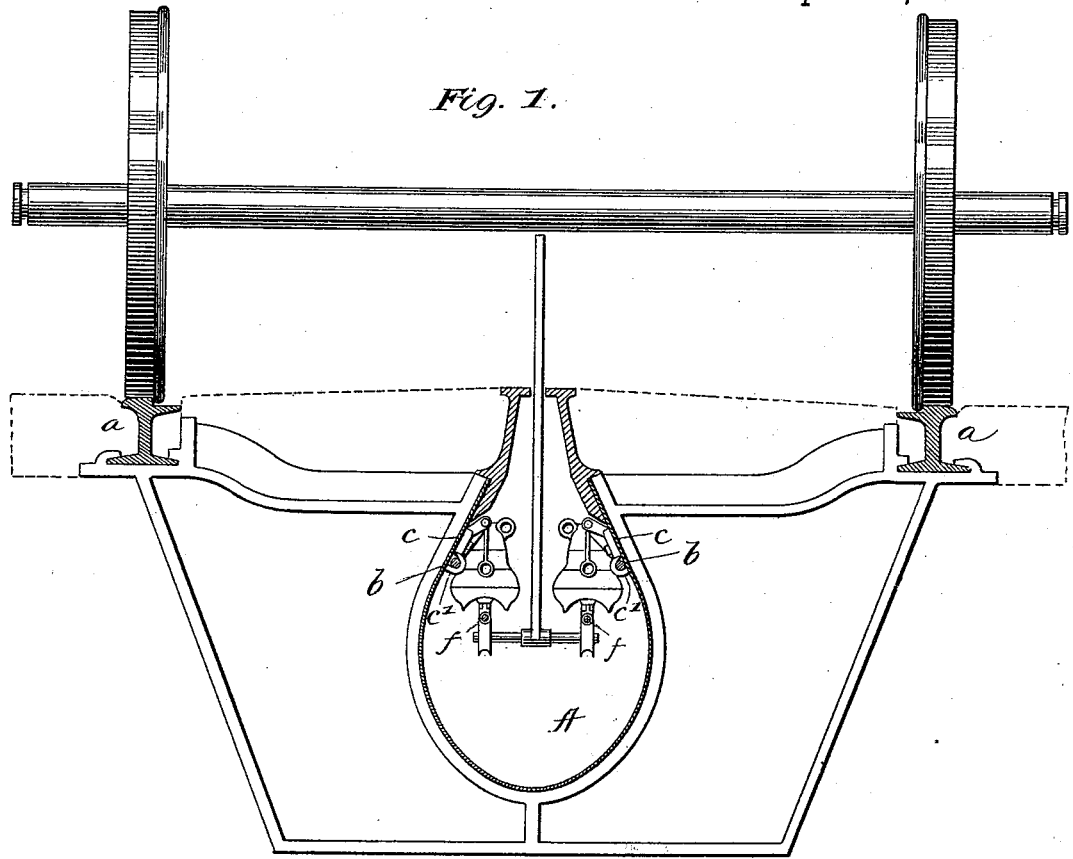
Figure 2:
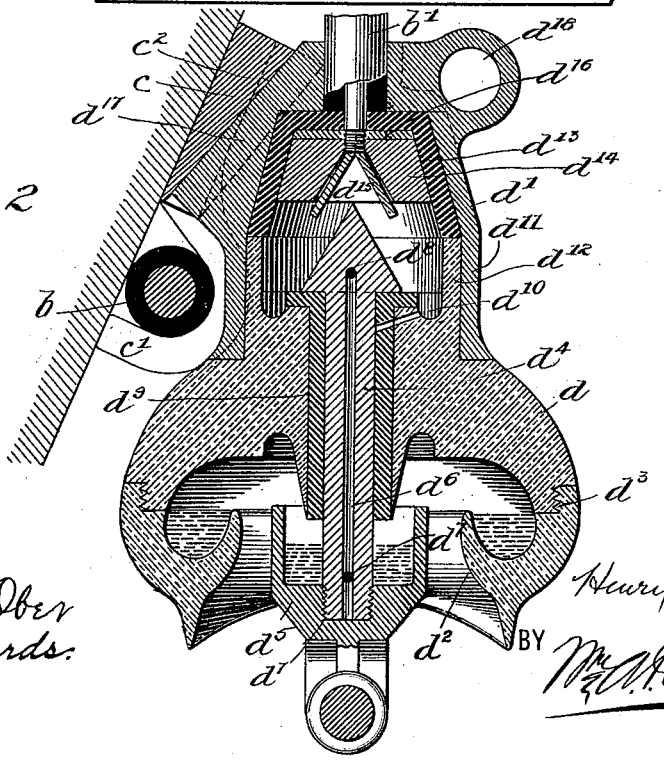
Figure 3:
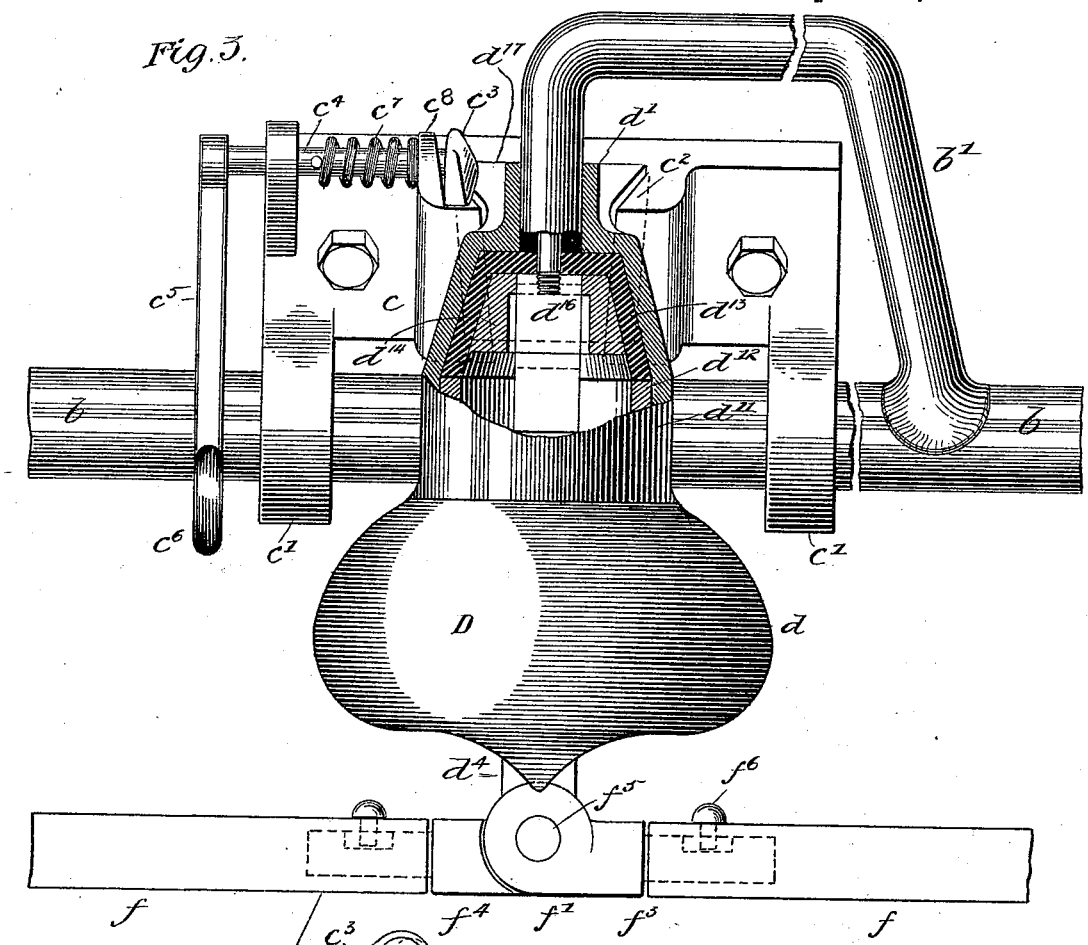
Figure 4:
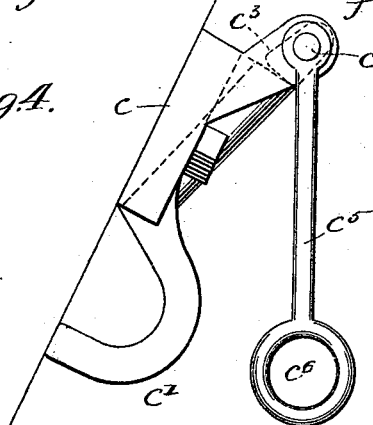
Figure 5:
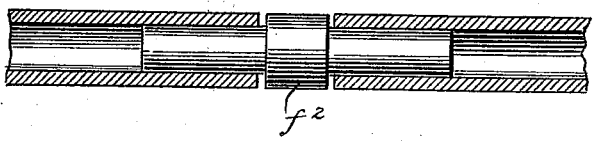

Figure 1 represents a transverse section of a road bed showing a portion of a car and its collecting device. Fig. 2 is a vertical central section of one of the insulating supports of the sectional conductor. Fig. 3 is a side elevation of the insulating support with parts broken away and also showing the means for attaching it to the conduit. Fig. 4 is an end view of the insulator supporting bracket, and Fig. 5 is a detail of a joint in the sectional conductor.

The shape of the conduit in which my conductors are supported is quite immaterial. In Fig. 1 the conduit is shown of the form commonly used in cable railways, for it was my intention in designing this system to provide for placing it in cable conduits without altering the conduit itself. The conduit is represented by the letter A and is located between the two rails $a$ of the track upon which the vehicle is run.

The main conductors or feeders are represented by $b$ and they are supported against the opposite sides of the conduit by means of brackets $c$ which are bolted to the sides or top of the conduit and are provided with loops or hooks $c'$ which grasp the conductor and hold it in position. Any other method of supporting this conductor may, however, be utilized. The brackets $c$ serve a more important function in supporting the insulators $d$, to which the sectional conductor $f$ is attached. The insulator itself is somewhat similar in construction to the one described in my application for patent, Serial No. 485,693, filed September 16, 1893. It consists of a body or skirt portion $d$ of nonconducting material such as porcelain or lava and a head $d'$ of metal. The body is provided with an inwardly turned ledge $d^2$ for the reception of oil. The body is perforated axially and fitted with a metallic reciprocating contact rod $d^4$. The head of the rod is wedge shaped and occupies a cavity in the upper end of the insulator. The lower end of the rod projects somewhat below the bottom of the insulator and carries a cup $d^5$ which will ordinarily contain oil, the oil surrounding the lower end of the rod. The rod is provided with a central passage $d^6$ which at one end communicates with the oil in the cup $d^5$ by means of a cross passage $d^7$, and at the other end communicates with the cavity in the upper end of the body of the insulator by means of a cross passage $d^8$. As shown in Fig. 2, the rod is surrounded by a bushing $d^9$, but this is not an essential element of the structure, as the fit between the rod and its bearing should be a loose one. The cavity in the upper end of the insulator communicates with the bearing surface of the rod through a passage $d^{10}$.

The metal head $d'$ of the insulator is provided with a cylindrical skirt $d^{11}$ which fits over a similar formation $d^{12}$ on the upper end of the body $d$. The joint between these two parts is air tight. The head is hollow and contains an inverted cup of insulating material $d^{13}$ in which is placed a metallic block $d^{14}$. In this block a wedge shaped cavity $d^{15}$ is formed and the cavity is occupied by two straps $d^{16}$ which are clamped between the block and the cup $d^{3}$. The free ends of the straps are separated, as shown, and form spring contacts adapted to connect with the wedge shaped head of the rod $d^{4}$.

The upper end of the head of the insulator is perforated to admit a branch conductor $b'$ which enters the top of the cup and is screwed or otherwise secured in contact with the metallic block $d^{14}$ and the straps. This branch conductor $b'$ connects positively at its opposite end with the main feeder $b$ and its point of connection with the feeder may be closely adjacent to the insulator or somewhat distant therefrom to bring the joint to a man hole where it may be reached when necessary. The head of the insulator is also formed with a double inclined dovetailed lug or projection $d^{17}$, which is adapted to fit into a correspondingly shaped socket $c^{2}$ in the bracket $c$. The lug drops into the socket from above and is held when the converging sides of the socket and projection meet, as shown in Fig. 3. The head of the insulator is also provided with an eye $d^{18}$, which may be engaged by a hook passed through the slot in the conduit to lift the insulator out of its socket.

In order to prevent displacement of the insulator by upward pressure from below, the latch $c^{3}$ is provided. This consists of a triangular head supported upon a rock shaft $c^{4}$ to rotate by means of crank arm $c^{5}$ which is fitted with an eye $c^{6}$ and turned by means of a hook passed through the slot of the conduit. In the position shown in Fig. 3 the insulator is locked to the bracket, but by lifting the arm $c^{5}$ the head $c^{3}$ is turned into such a position that it does not interfere with the upward movement of the insulator. A spring $c^{7}$ is also provided, the function of which is to draw the shaft in the direction of the arm $c^{5}$; the inside of the ear $c^{8}$ is inclined and the back of the head $c^{3}$ is correspondingly inclined so that when the arm $c^{5}$ is in the position shown in Fig. 3 the head $c^{3}$ is thrust inward over the end of the lug $d^{17}$ as well as above it in the manner above mentioned. When the arm $c^{5}$ is lifted the inclined faces gradually move into the same plane with each other and the spring draws the head $c^{3}$ away from the lug $d^{17}$. It is noted here that the latch just described is purely a latch and is distinguishable from a permanent form of fastening which has no ready means of locking and releasing. It will be seen therefore, that by passing a hook down through the slot of the conduit the insulator may be first released by lifting the arm $c^{5}$, and then removed from its socket. When so removed it may be carried along through the conduit to a man hole, where it may be taken out bodily or repaired at that location.

The sectional conductor $f$ consists merely of sections of pipe made in any desired length and coupled together at the insulators by means of a hinged joint $f'$, and between the insulators by means of cylindrical couplers $f^{2}$ of non conducting material. The joint $f'$ consists of two parts $f^{3}$ and $f^{4}$ hinged together and to a downward projection from the rod $d^{4}$ or the cup $d^{5}$ attached to it, by means of a pivot pin $f^{5}$. The two parts of the joint respectively enter the adjacent ends of the sectional conductor $f$ and are secured thereto by means of screws $f^{6}$ which pass through the conductor and enter grooves in the parts of the joint. This provides for slight longitudinal movements of the conductor sections to compensate for expansion and contraction or misfits. The joint $f^{2}$ consists of a middle cylinder having two smaller cylinders projecting from its ends. The sections of the conductors fit closely upon this device and form a rigid joint, the parts of the conductor being insulated from each other. With this device an under contact trolley or collecting device will be used. It is shown conventionally in Fig. 1, and carries wheels on each side which engaged respectively with the positive and negative conductors. The connection between the trolley carrier and the car will be such that the collecting wheels will be maintained always in the same vertical plane. As the trolley moves along with the car the sectional conductor is lifted and the rods $d^{4}$ of the insulators connected with the insulator sections are caused to move upward into contact with the straps $d^{16}$ and thus complete the circuit from the main conductor $b$ to the section of the sectional conductor which the trolley is in contact with; the motor on the vehicle thus receives the current. As the car passes, the sectional conductor falls by its own weight, thus breaking the circuit and de-energizing the exposed conductor. This reciprocating movement of the rod $d^{4}$ causes a pumping action which lifts the oil from the cup $d^{5}$ into the cavity in the upper end of the insulator; that is to say, when the rod lifts it displaces air in the cavity which is forced downward through the rod and through the oil; when the rod falls the pressure of the atmosphere on the outside overcoming that in the cavity forces the oil in the cup up through the rod into the cavity; thence the oil flows through the passage $d^{10}$ and along the bearing surface of the rod back into the cup $d^{5}$. A portion of the oil will creep along the lower surfaces of the insulator, thus thoroughly insulating these parts. It will be noted that owing to the fact that the edge of the cup $d^{5}$ and the ledge $d^{2}$ extends upward some distance from the lower edge of the insulator, water cannot come into contact with the rod $d^4$ when the conduit is flooded, because the air pressure in the tight chamber above these two edges will prevent the rise of water. In other words the insulator acts as a diving bell. It is further observed that the lower edges of the insulator gradually converge to two points diametrically opposite each other and in a line at right angles to the line of the sectional conductor. Figs. 2 and 3 fully illustrate this. The object of this construction is to conduct water or moisture to these extreme points before it drops from the insulator. The sectional conductor is thereby protected from such falling water.

The function of the joint $f^5$ in the sectional conductor is to allow an easy movement of the conductor when the trolley passes, but more particularly its function is to facilitate the removal of the insulator and its connected sections, from the conduit. This is accomplished by separating the sections at the joints $f^2$ which occur at the man holes then lifting the insulators out of their sockets in the manner above described. Then by lifting the free end of the section upward through the man hole, and at the same time carrying the section along the conduit, the entire section with its connected insulators may be brought out to the surface of the ground. When the end of the section is thus lifted through the man hole the joints $f^5$, which occur at the intermediate insulators along the section, bend and thus direct the lifted end through the man hole while a horizontal portion of the section remains trailing through the conduit.

It is obvious that this system may be used on the surface of the road bed, more particularly for elevated structures, by simply mounting the insulators and the brackets which support them upon posts along the roadway. My invention is therefore not confined to a conduit system.

Having thus described my invention, I claim—

1. In an electric railway system, the combination of a conduit, a sectional electric conductor located therein, insulators positively attached to and supporting the sections of said sectional conductor, the insulators being constructed to be freely removable from their mountings, whereby one or more sections with their attached insulators may be bodily removed from the conduit.

2. In an electric railway system, the combination of a conduit, a sectional electric conductor located therein and provided at intervals with flexible joints, insulators positively attached to and supporting the sections of said sectional conductor, the insulators being constructed to be freely removable from their mountings, whereby one or more sections with their attached insulators may be bodily removed from the conduit.

3. In an electric railway system, a working sectional conductor, the sections of which are provided, between their extremities, with flexible joints, through which the electric circuit is continuous for the purpose set forth.

4. In an electric railway system, a sectional conductor having rigid insulated joints and flexible uninsulated joints, for the purpose set forth.

5. In an electric railway system, fixed sockets or seats for insulators, in combination with insulators fitting into said sockets or seats and latches to prevent the removal of the insulators from the seats.

6. In an electric railway system, a stationary insulator provided with an internal contact chamber, a vertically reciprocating rod entering said chamber, a working conductor carried by said rod and means for automatically forcing oil into the contact chamber when the rod reciprocates, substantially as described.

7. In an electric railway system, a stationary insulator provided with an internal contact chamber, a vertically reciprocating rod entering said chamber, a working conductor carried by said rod, a cup of oil located at the lower end of said rod, the rod provided with a passage communicating at one end with the oil in the cup and at the other end with the contact chamber, substantially as described.

8. In an electric railway system, a stationary insulator provided with an internal contact chamber, a vertically reciprocating rod entering said chamber, a working conductor carried by said rod, a cup of oil located at the lower end of said rod, the rod provided with a passage communicating at one end with the oil in the cup and at the other end with the contact chamber, and a second passage leading from the contact chamber to the oil cup.

9. In an electric railway system, an insulator provided with an internal contact chamber and a reciprocating contact rod, in combination with an oil reservoir and suitable passages leading therefrom to the chamber, whereby the suction caused by the reciprocation of the rod will force oil into the contact chamber.

10. In an electric railway system, an insulator supporting a working conductor and provided with a reciprocating contact rod, said rod carrying an oil cup, substantially as described.

11. In an electric railway system, a vertically supported insulator having its lower edge tapered downward to form dripping points, in combination with a conductor supported by the insulator and extending across its lower end between the dripping points.

12. In an electric railway system, a stationary insulator supporting a working conductor, and having a reciprocating contact rod moving in it and provided with an interior annular oil channel, forming an insulator between its inner and outer surfaces for the purpose set forth.

13. In an electric railway system, an insulator containing an internal contact chamber, and having its lower end open and its upper end closed air tight, a reciprocating contact rod moving in said contact chamber, and an air outlet leading from the contact chamber to the lower end of the insulator, whereby the insulator will act in the nature of a diving bell, in the presence of water, and thereby protect the contacts against moisture.

In testimony whereof I subscribe my signature in presence of two witnesses.

HENRY S. PRUYN.

Witnesses:
S. B. MORSE,
MINNIE PATERSON.